United States Patent
Hirooka et al.

(10) Patent No.: US 12,230,932 B2
(45) Date of Patent: Feb. 18, 2025

(54) WIRE HARNESS

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventors: Toshiya Hirooka, Yokkaichi (JP); Daisuke Hashimoto, Yokkaichi (JP); Ayumu Ishihara, Yokkaichi (JP)

(73) Assignees: Autonetworks Technologies, LTD., Mie (JP); Sumitomo Wiring Systems, LTD., Mie (JP); Sumitomo Electric Industries, LTD., Osaka (JP)

( * ) Notice: Subject to any disclaimer, the term of this patent is extended or adjusted under 35 U.S.C. 154(b) by 357 days.

(21) Appl. No.: 17/909,219

(22) PCT Filed: Mar. 16, 2021

(86) PCT No.: PCT/JP2021/010702
§ 371 (c)(1),
(2) Date: Sep. 2, 2022

(87) PCT Pub. No.: WO2021/193259
PCT Pub. Date: Sep. 30, 2021

(65) Prior Publication Data
US 2023/0092993 A1    Mar. 23, 2023

(30) Foreign Application Priority Data
Mar. 23, 2020 (JP) .................................. 2020-050703

(51) Int. Cl.
*H01R 4/30* (2006.01)
*H01B 7/00* (2006.01)
*H01B 13/012* (2006.01)

(52) U.S. Cl.
CPC ............ *H01R 4/30* (2013.01); *H01B 7/0045* (2013.01); *H01B 13/01209* (2013.01)

(58) Field of Classification Search
CPC ... H01R 4/28; H01R 4/30; H01B 7/00; H01B 7/0045; H01B 13/012; H01B 13/01209
(Continued)

(56) References Cited

U.S. PATENT DOCUMENTS

| | | | |
|---|---|---|---|
| 11,916,337 B2* | 2/2024 | Kawaguchi | ............ H01R 13/50 |
| 2018/0102203 A1 | 4/2018 | Nakai et al. | |
| 2023/0092993 A1* | 3/2023 | Hirooka | ............... H01R 13/025 |
| | | | 439/889 |

FOREIGN PATENT DOCUMENTS

| | | |
|---|---|---|
| JP | H10-224967 A | 8/1998 |
| JP | 2003-016843 A | 1/2003 |

(Continued)

OTHER PUBLICATIONS

Jun. 8, 2021 Search Report issued in International Patent Application No. PCT/JP2021/010702.

*Primary Examiner* — Khiem M Nguyen
(74) *Attorney, Agent, or Firm* — Oliff PLC

(57) ABSTRACT

A wire harness including: an electric wire including a core wire and an insulating cover that covers the core wire; and a tube that surrounds the electric wire, wherein: the electric wire further includes a covered portion in which the core wire is covered by the insulating cover, and an exposed portion in which the core wire is exposed from the insulating cover, the exposed portion includes a bend that is bent so as to protrude in a direction orthogonal to a length direction of the core wire, and the bend is provided outside of the tube.

4 Claims, 3 Drawing Sheets

(58) Field of Classification Search
USPC .......................................................... 439/889
See application file for complete search history.

(56) References Cited

FOREIGN PATENT DOCUMENTS

| | | |
|---|---|---|
| JP | 2005-044607 A | 2/2005 |
| JP | 2018-063764 A | 4/2018 |

* cited by examiner

WIRE HARNESS

BACKGROUND

The present disclosure relates to a wire harness.

As one example, a wire harness for a vehicle described in JP 2005-44607A includes an electric wire for electrically connecting a pair of mating components to each other, and a tubular exterior member that surrounds the electric wire. A flexible wire such as a stranded wire is used as the electric wire. Also, a clearance is set between the electric wire and the inner surface of the exterior member, and the electric wire is allowed to bend inside the exterior member. In this wire harness, the length of the electric wire is set such that electrical connection is possible even if the positional tolerance of the pair of mating components is at the maximum value. The positional tolerance of the mating components is absorbed by bending of the electric wire inside the exterior member.

SUMMARY

With a wire harness such as that described above, a clearance for absorbing tolerance needs to be set between the electric wire and the inner surface of the exterior member, and thus there is room for improvement in terms of reducing the size of the exterior member.

An exemplary aspect of the disclosure provides a wire harness that enables a reduction in the size of the exterior member.

A wire harness according to an aspect of the present disclosure includes: an electric wire including a core wire and an insulating cover that covers the core wire; and a tube that surrounds the electric wire, wherein: the electric wire further includes a covered portion in which the core wire is covered by the insulating cover, and an exposed portion in which the core wire is exposed from the insulating cover, the exposed portion includes a bend that is bent so as to protrude in a direction orthogonal to a length direction of the core wire, and the bend is provided outside of the tube.

According to the present disclosure, it is possible to provide a wire harness that enables a reduction in the size of the tube.

DETAILED DESCRIPTION OF EMBODIMENTS

Description of Embodiments of Present Disclosure

Figure 1:
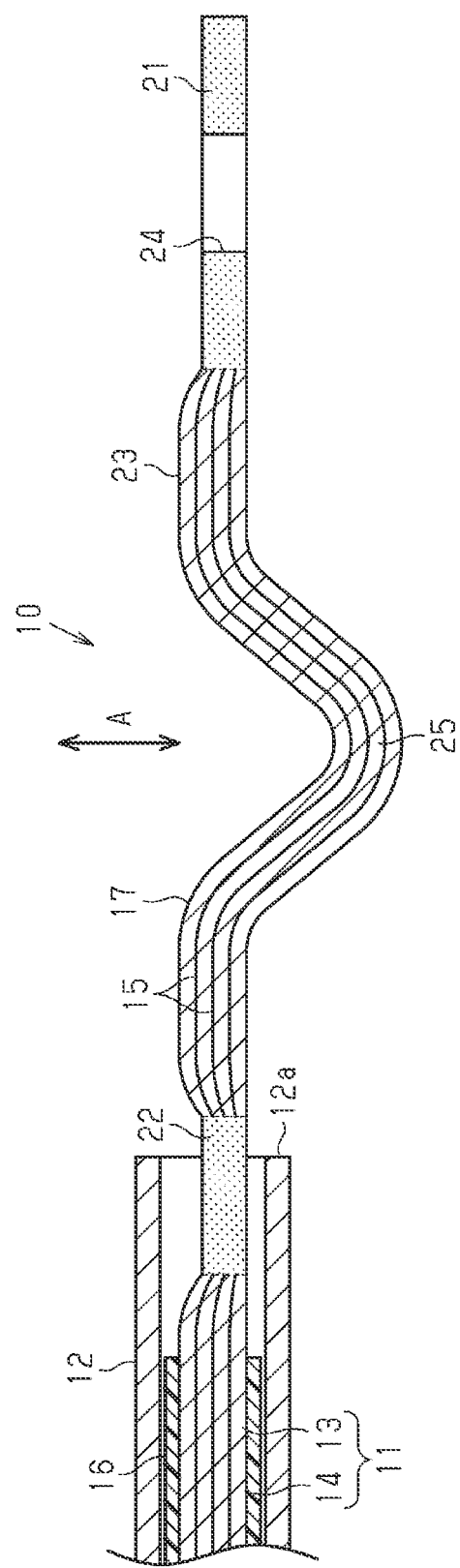
FIG. 1 is a schematic cross-sectional view schematically showing a wire harness according to an embodiment.

First, embodiments of the present disclosure will be listed and described.

A wire harness according to an aspect of the present disclosure is:

[1] A wire harness including: an electric wire including a core wire and an insulating covering that covers the core wire; and a tubular exterior member surrounding the electric wire, wherein the electric wire further includes a covered portion in which the core wire is covered by the insulating covering, and an exposed portion in which the core wire is exposed from the insulating covering, the exposed portion includes a bent portion that is bent so as to protrude in a direction orthogonal to a length direction of the core wire, and the bent portion is provided outside of the exterior member.

According to this configuration, the bent portion of the exposed portion, in which the core wire is exposed, is provided outside of the exterior member. Also, positional tolerance of a mating component to which the electric wire is to be connected can be absorbed by the bending of the bent portion. Accordingly, a clearance for absorbing tolerance does not need to be set between the electric wire and the inner surface of the exterior member (or even if a clearance is set, the clearance can be set small), thus making it possible to reduce the size of the exterior member in a direction orthogonal to the electric wire insertion direction.

[2] A configuration is possible in which the core wire is constituted by a plurality of strands, and the bent portion is formed in a bent shape by press working. According to this configuration, it is possible to suitably form the exposed portion of the core wire that includes the bent portion.

[3] A configuration is possible in which the exposed portion includes a connection portion configured to be connected to a mating component, and the connection portion is hardened due to the plurality of strands being joined to each other.

According to this configuration, in the connection portion formed in the exposed portion of the core wire, the strands that constitute the core wire are joined to each other. Accordingly, the exposed portion of the core wire does not need to be separately provided with a metal terminal or the like for connection with the mating component, thus making it possible to suppress an increase in the number of components of the wire harness.

[4] A configuration is possible in which the exposed portion includes a hardened portion that is hardened due to the plurality of strands being joined to each other, the hardened portion being separate from the connection portion, and in the exposed portion, the bent portion is formed between the connection portion and the hardened portion. According to this configuration, the bent portion is formed between the hardened portion and the connection portion, which are hardened portions of the exposed portion, and therefore the strands are likely to remain organized when forming the bent portion, and as a result, the bent portion can be formed easily. In particular, the effect of facilitating the formation of the bent portion by providing the hardened portion is significant in the case where the exposed portion of the electric wire is long.

Details of Embodiments of Present Disclosure

A specific example of a wire harness according to the present disclosure will be described below with reference to the drawings. In the drawings, some configurations may be exaggerated or simplified for convenience in the description. Also, the dimensional ratios of portions may differ among the drawings. Moreover, the terms "parallel" and "orthogonal" in the present specification include not only the case of being strictly parallel or orthogonal, but also the case of being substantially parallel or substantially orthogonal to the extent that actions and effects in the embodiment are exhibited. It should be noted that the present disclosure is not limited to the examples herein, but rather is indicated by the scope of claims, and is intended to include all modifications within a meaning and scope equivalent to the scope of claims.

A wire harness 10 shown in FIG. 1 is a wire harness used for electrical connection in a battery module (not shown) in a hybrid vehicle, an electric automobile, or the like. The wire harness 10 includes an electric wire 11, which is a coated electric wire, and a tubular exterior member 12 (tube) that surrounds the electric wire 11, specifically a portion thereof in the length direction of the electric wire 11.

Configuration of Exterior Member 12

The exterior member 12 is overall shaped as an elongated tube. Note that the shape of a cross-section of the exterior member 12 taken in a direction orthogonal to the length direction (i.e., the transverse sectional shape) can be any shape such as the shape of a circular tube, an elliptical tube, or a polygonal tube. The electric wire 11 is inserted into an internal space inside the exterior member 12.

Note that the term "tubular" in the present specification need only refer to a shape that appears to be tubular overall, and encompasses a tubular shape that is a combination of multiple components, a tubular shape partially having a notch as with a C-shape, or the like. The exterior member 12 of the present embodiment is constituted by one component.

The exterior member 12 of the present embodiment is configured as a shield protector for preventing electromagnetic noise emitted by the electric wire 11 from leaking to the outside, for example. In the case of serving as a shield protector, the exterior member 12 is formed from a conductor such as a metal. The shield protector can be formed from a metal material such as copper-based or aluminum-based material.

Configuration of Electric Wire 11

The electric wire 11 includes a core wire 13 and an insulating covering 14 (insulating cover) that covers the core wire 13. The insulating covering 14 is made of a synthetic resin, for example. The core wire 13 is configured to have a high flexibility. The core wire 13 is constituted by a plurality of strands 15, for example. The core wire 13 can be constituted by a braided wire in which the strands 15 are woven, or a stranded wire in which the strands 15 are twisted, for example. Note that the strands 15 can be formed using a metal material such as a copper-based or aluminum-based material, for example.

The electric wire 11 includes a covered portion 16 in which the core wire 13 is covered with an insulating covering 14, and an exposed portion 17 in which the core wire 13 is exposed from the insulating covering 14 due to the insulating covering 14 being removed from (i.e., peeled away from) a lengthwise end portion of the electric wire 11. The exposed portion 17 is formed at a lengthwise end portion of the electric wire 11. Since the exposed portion 17 does not have the insulating covering 14, the exposed portion 17 has a higher flexibility (bendability) than the covered portion 16.

Configuration of Exposed Portion 17

The exposed portion 17 of the core wire 13 includes a connection portion 21 (connection), a hardened portion 22, and a flexible portion 23 formed between the connection portion 21 and the hardened portion 22.

Configuration of Connection Portion 21

The connection portion 21 is a portion for connection to a mating component that is not shown (such as a terminal on the battery module side in the present embodiment). In the connection portion 21, the strands 15 that constitute the core wire 13 are joined to each other to obtain a higher rigidity than the portion where the strands 15 are not joined to each other. In the connection portion 21, the strands 15 are joined to each other (integrated) by ultrasonic welding or resistance welding, for example. The connection portion 21 is shaped as a substantially flat plate that is squashed in a direction orthogonal to the length direction of the core wire 13, for example.

The connecting portion 21 is provided with a through hole 24 that extends through the connecting portion 21 in the plate thickness direction, for example. A bolt (not shown) for fixing to the mating component is inserted into the through hole 24. The connecting portion 21 is fixed to the mating component by screwing the bolt. Due to joining the strands 15 together so as to be hardened as described above, the connecting portion 21 has a rigidity that can withstand fastening and fixing with the bolt (a rigidity according to which damage or deformation does not occur).

Configuration of Hardened Portion 22

The hardened portion 22 is a hardened portion (second hardened portion) formed by joining the strands 15 to each other so as to have a higher rigidity than the flexible portion 23. In the hardened portion 22, the strands 15 are joined (integrated) to each other by ultrasonic welding or resistance welding, for example. The hardened portion 22 is shaped as a substantially flat plate that is squashed in a direction orthogonal to the length direction of the core wire 13.

Configuration of Flexible Portion 23

A portion of the exposed portion 17 between the connection portion 21 and the hardened portion 22 is configured as the flexible portion 23. In the flexible portion 23, unlike the connection portion 21 and the hardened portion 22, hardening by joining the strands 15 is not performed, and flexibility is maintained in the core wire 13 (the stranded wire or the braided wire) constituted by the strands 15. Accordingly, the flexible portion 23 has a higher flexibility than the hardened portion 22 and the connection portion 21 that have been hardened, as well as the covered portion 16 in which the core wire 13 is covered by the insulating covering 14.

The flexible portion 23 includes a bent portion 25 (bend) that has a bent shape formed by press working, which will be described later. The bent portion 25 is bent in a substantially U-like shape that protrudes in a direction (direction A in FIG. 1) orthogonal to the length direction of core wire 13. Note that the bent portion 25 of the present embodiment protrudes in only one direction along the direction A, for example.

In the electric wire 11 having the above configuration, the covered portion 16 of the electric wire 11 is arranged inside the exterior member 12. On the other hand, the bent portion 25 and the connecting portion 21 of the exposed portion 17 are provided outside of the exterior member 12. The hardened portion 22 of the exposed portion 17 is located circumferentially inward of a lengthwise end surface 12a of the exterior member 12, for example. In other words, the end surface 12a of the exterior member 12 and the hardened portion 22 are arranged at the same position as each other in the length direction of the electric wire 11. Also, in the hardened portion 22, a portion of the hardened portion 22 is located inside the exterior member 12, and a portion of the hardened portion 22 is located outside of the exterior member 12, for example. Also, the end portion of the bent portion 25 in the direction A protrudes outward beyond the outer surface of the exterior member 12, for example.

Next, a mode of processing of the exposed portion 17 in the electric wire 11 will be described.

First, the exposed portion 17 is formed by peeling away the insulating covering 14 from a lengthwise end portion of the electric wire 11.

Subsequently, in the exposed portion 17, the connection portion 21 and the hardened portion 22 are formed by joining and hardening the strands 15 that constitute the core wire 13 by ultrasonic welding or resistance welding, for example. Note that a configuration is possible in which either the connection portion 21 or the hardened portion 22 is hardened first, and then the other one is hardened, or the connection portion 21 and the hardened portion 22 may be hardened at the same time. Also, due to the hardening of the connection portion 21 and the hardened portion 22, the flexible portion 23 is formed between the connection portion 21 and the hardened portion 22.

Figure 2:
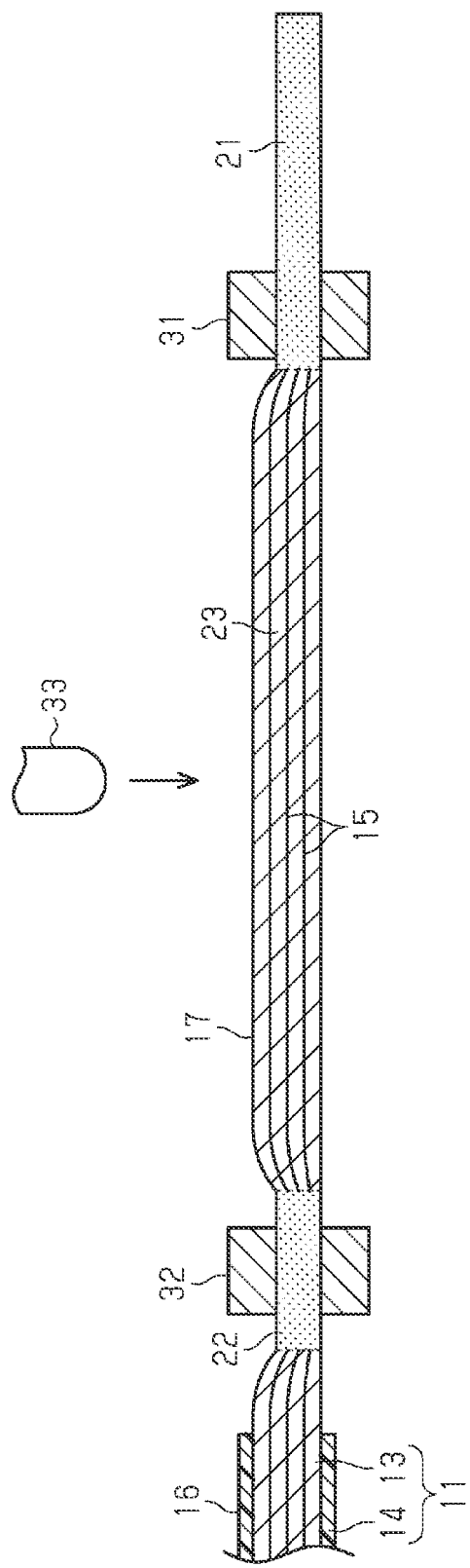
FIG. 2 is a schematic cross-sectional view for describing a mode of processing performed on the wire harness according to the embodiment.

Next, as shown in FIG. 2, the connection portion 21 is held by a first holding jig 31, and the hardened portion 22 is held by a second holding jig 32. Also, the flexible portion 23 is pulled straight while holding the connection portion 21 and the hardened portion 22. Note that at this point, the through hole 24 has not yet been formed in the connection portion 21.

Subsequently, the bent portion 25 is formed in the flexible portion 23 by performing press working with use of a pressing jig 33. At this time, the pressing jig 33 is used to press the straight flexible portion 23 from a direction orthogonal to the length direction of the flexible portion 23. Also, at the same time as the flexible portion 23 is pressed by the pressing jig 33, at least either the first holding jig 31 holding the connecting portion 21 or the second holding jig 32 holding the hardened portion 22 is moved closer to the other one. Accordingly, the bent portion 25 is formed having a bent shape protruding in the direction A, which is orthogonal to the length direction of the core wire 13.

Actions of the present embodiment will be described below.

The bent portion 25 provided outside of the exterior member 12 has a bent shape protruding in the direction A orthogonal to the length direction of the core wire 13, and thus the bent portion 25 can easily bend mainly in the length direction of the core wire 13. Therefore, positional tolerance of mating components connected to the end portions of the electric wire 11 in the length direction is absorbed by the bending of the bent portion 25. Also, due to the bending of the bent portion 25, it is possible to also absorb positional deviation of a mating component or the like caused by thermal expansion.

Effects of the present embodiment will be described below.

(1) The covered portion 16 of the electric wire 11 is provided inside the exterior member 12, and the bent portion 25 of the exposed portion 17 of the electric wire 11 is provided outside of the exterior member 12. According to this configuration, positional tolerance of a mating component (not shown) to which the electric wire 11 is to be connected can be absorbed by the bending of the bent portion 25 of the exposed portion 17 provided outside of the exterior member 12. Accordingly, a clearance for absorbing tolerance does not need to be set between the covered portion 16 of the electric wire 11 and the inner surface of the exterior member 12, thus making it possible to reduce the size of the exterior member 12 in the direction orthogonal to the insertion direction of the electric wire 11 (direction along the direction A).

(2) The core wire 13 of the electric wire 11 is constituted by a plurality of strands 15. The bent portion 25 of the exposed portion 17 is formed in a bent shape by press working. According to this configuration, it is possible to suitably form the exposed portion 17 that includes the bent portion 25.

(3) The exposed portion 17 includes the connection portion 21 that is to be connected to a mating component. Also, the connection portion 21 is hardened due to the strands 15 being joined to each other. According to this configuration, in the connection portion 21 formed in the exposed portion 17 of the core wire 13, the strands 15 that constitute the core wire 13 are joined to each other. Accordingly, the exposed portion 17 of the core wire 13 does not need to be separately provided with a metal terminal or the like for connection to the mating component, and thus it is possible to suppress an increase in the number of components of the wire harness 10.

(4) The exposed portion 17 includes the hardened portion 22 that is hardened due to the strands 15 being joined to each other, the hardened portion 22 being separate from the connection portion 21. Also, in the exposed portion 17, a bent portion 25 is formed between the connection portion 21 and the hardened portion 22. According to this configuration, the bent portion 25 is formed between the connection portion 21 and the hardened portion 22, which are hardened portions of the exposed portion 17, and therefore the strands 15 are likely to remain organized when forming the bent portion 25, and as a result, the bent portion 25 can be formed easily. In particular, the effect of facilitating the formation of the bent portion 25 by providing the hardened portion 22 is significant in the case where the exposed portion 17 of the electric wire 11 is long.

(5) The hardened portion 22 of the exposed portion 17 is located circumferentially inward of the lengthwise end surface 12a of the exterior member 12. According to this configuration, the bent portion 25 of the exposed portion 17 can be suitably arranged outside of the exterior member 12. If the hardened portion 22 is located circumferentially inward of the end surface 12a of the exterior member 12, the opening edge of the exterior member 12 frequently comes into contact with the hardened portion 22. However, due to the strands 15 being joined to each other to harden the hardened portion 22, it is possible to prevent or suppress breakage of the strands 15 caused by the opening edge of the exterior member 12.

The present embodiment can be implemented with modifications such as the following. The present embodiment and the following modified examples can be implemented in combination with each other as long as no technical contradiction arises.

Figure 3:
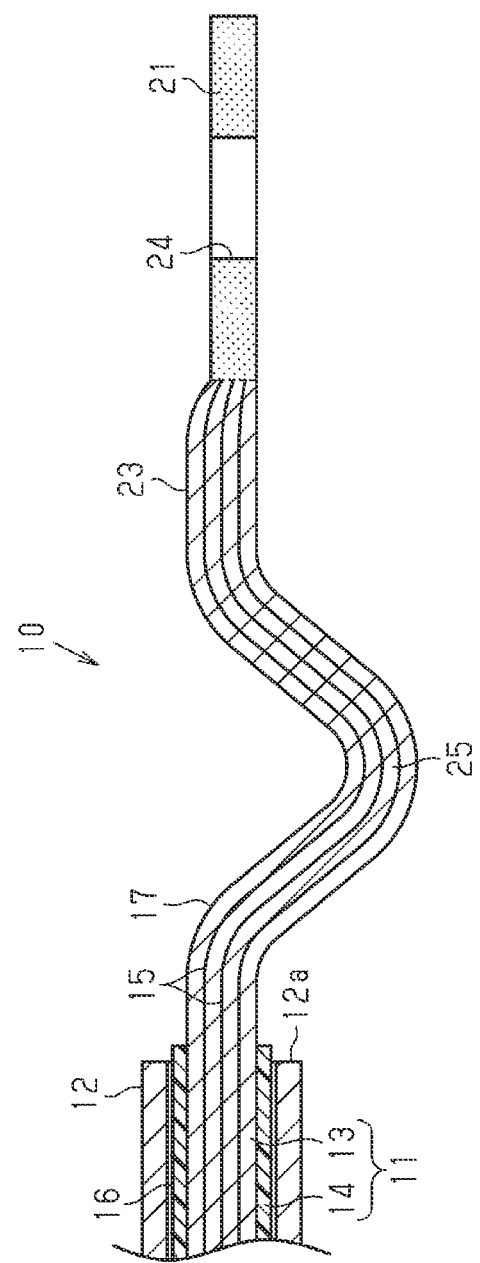
FIG. 3 is a schematic cross-sectional view schematically showing a wire harness according to a modified example.

For example, as shown in FIG. 3, the hardened portion 22 may be omitted from the electric wire 11 of the above embodiment. This configuration is suitable when it is difficult to secure a sufficient length for the exposed portion 17 in the electric wire 11. When forming the bent portion 25 in this configuration, it is preferable to hold the covered portion 16 (the outer peripheral surface of the insulating covering 14) with the second holding jig 32.

The hardened portion 22 may be entirely arranged inside the exterior member 12 or outside of the exterior member 12.

The connecting portion 21 may be constituted by a metal terminal that is separate from the core wire 13.

The bent shape of the bent portion 25 is not limited to being a substantially U-like shape protruding in only one direction along the direction A, and can be changed to, for example, a substantially V-like shape. As another example, the bent portion 25 may be bent in a wavy shape when viewed from a direction orthogonal to the length direction of the core wire 13.

The braided wire constituting the core wire 13 may be a braided wire formed by combining metal strands and resin strands, for example. For example, the resin strands can be reinforcing fibers that have excellent insulating properties and shear resistance, such as para-aramid fibers.

The core wire 13 is not limited to being formed by the materials described in the above embodiment, and may be constituted by a conductive member other than a braided wire or stranded wire constituted by a plurality of strands 15, as long as it is a conductive member that has high flexibility (bendability).

In the above embodiment, when forming the electric wire 11, the core wire 13 is covered by the insulating covering 14 over the entire length of the electric wire 11, and then exposed portion 17 is formed by removing the insulating covering 14 from a lengthwise end portion of the electric wire 11, but the present disclosure is not limited to this, and the exposed portion 17 may have already been formed when forming the electric wire 11.

In the above embodiment, the entirety of the covered portion 16 (insulating coating 14) of the electric wire 11 in the length direction is arranged inside the exterior member 12, but the present disclosure is not limited to this, and a lengthwise end portion of the covered portion 16 (insulating coating 14) of the electric wire 11 may project out from the exterior member 12, for example.

The exterior member 12 may be formed from a resin material. The resin exterior member 12 can be formed using a synthetic resin such as polyolefin, polyamide, polyester, or ABS resin.

In the above embodiment, the present disclosure is applied to the wire harness 10 used for electrical connection of a battery module, but the present disclosure is not limited to this, and may be applied to a wire harness used for electrical connection of an in-vehicle device other than a battery module.

As shown in the side view of FIG. 1, the hardened portion 22 may be located circumferentially inward of the exterior member 12 at a position overlapped with the lengthwise end surface 12a of the exterior member 12. According to this configuration, the bent portion 25 of the exposed portion 17 can be suitably arranged outside of the exterior member 12. This is also advantageous to reducing or preventing damage or breakage of the strands 15 caused by the opening edge of the exterior member 12.

As shown in FIG. 1, a portion or all of the bent portion 25 may be arranged outside of the opening end surface 12a of the exterior member 12 in the lengthwise direction of the exterior member 12.

As shown in FIG. 1, in the standalone state of the wire harness 10, before the wire harness 10 is connected to the mating component, the electric wire 11 may be bent in advance such that at least a portion of the bent portion 25 is outward of the outermost surface of the exterior member 12 in the diameter direction of the exterior member 12, for example.

The first connecting portion 21 in the above embodiment may be referred to as the leading end of the exposed portion 17 of the electric wire 11 or a first length portion of the exposed portion 17. The hardened portion 22 of the embodiment may be referred to as the base end of the exposed portion 17 of the electric wire 11 or a second length portion of the exposed portion 17.

The flexible portion 23 in the above embodiment may be referred to as an intermediate portion between the leading end and the base end of the exposed portion 17, or a third length portion of the exposed portion 17.

The first connecting portion 21 in the above embodiment may be referred to as a first joined strand block in which a plurality of conductive strands 15 are compressed and joined over a first length so as to be immovable relative to each other. The hardened portion 22 in the above embodiment may be referred to as a second joined strand block in which a plurality of conductive strands 15 are compressed and joined over a second length so as to be immovable relative to each other. The flexible portion 23 of the electric wire 11 in the above embodiment may be referred to as a bundle or unjoined portion of conductive strands 15, in which a plurality of conductive strands 15 are movable relative to each other and are not joined to each other.

In the electric wire 11 in the above embodiment, the volume percentage of voids in the first connecting portion 21 per unit volume of the first connecting portion 21 may be referred to as the first void rate. The volume percentage of voids in the hardened portion 22 per unit volume of the hardened portion 22 may be referred to as the second void rate. The volume percentage of voids in the flexible portion 23 per unit volume of the flexible portion 23 may be referred to as the third void rate. The first void rate may be the same as or different from the second void rate. The first void rate and/or the second void rate may be smaller than the third void rate. In other words, in the embodiment, the conductor volume percentage of the flexible portion 23, which is the percentage of the volume of the conductor in the flexible portion 23 per unit volume of the flexible portion 23, may be lower than the conductor volume percentage of the first connecting portion 21, which is the percentage of the volume of the conductor in the first connecting portion 21 per unit volume of the first connecting portion 21, and/or lower than the conductor density of the hardened portion 22.

The conductive strands 15 may extend seamlessly and continuously over the entire length of the electric wire 11, for example, in a length range including at least the first connection portion 21 and the hardened portion 22.

The entirety of the first connecting portion 21 and/or the entirety of the hardened portion 22 in the above embodiment may be constituted by only the strands 15.

The invention claimed is:

1. A wire harness comprising:
an electric wire including a core wire and an insulating cover that covers the core wire; and
a tube that surrounds the electric wire, wherein:
the electric wire further includes:
a covered portion in which the core wire is covered by the insulating cover, and
an exposed portion in which the core wire is exposed from the insulating cover,
the exposed portion includes a bend that is bent so as to protrude in a direction orthogonal to a length direction of the core wire, and
the bend is provided outside of the tube.

2. The wire harness according to claim 1, wherein:
the core wire is formed by a plurality of strands, and
the bend is formed in a bent shape by press working.

3. The wire harness according to claim 2, wherein:
the exposed portion includes a connection configured to be connected to a mating component, and the connection is hardened due to the plurality of strands being joined to each other.

4. The wire harness according to claim 3, wherein:

the exposed portion includes a hardened portion that is hardened due to the plurality of strands being joined to each other, the hardened portion being separate from the connection, and in the exposed portion, the bend is formed between the connection and the hardened portion.

\* \* \* \* \*